Aug. 27, 1929.                H. ORSENIGO                1,726,362
                  JOINT FOR ARTICLES OF FURNITURE AND THE LIKE
                              Filed March 26, 1925
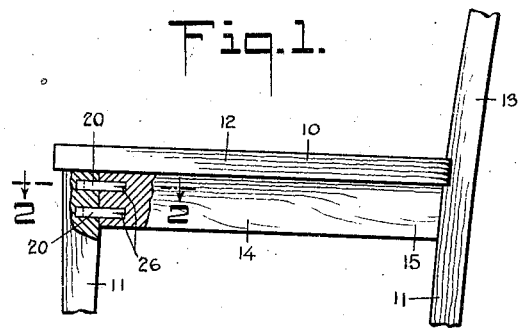
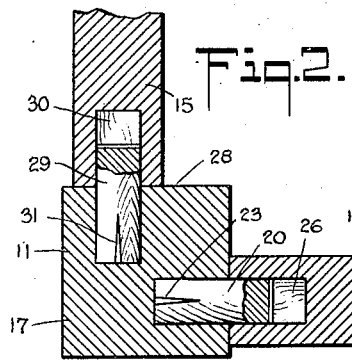
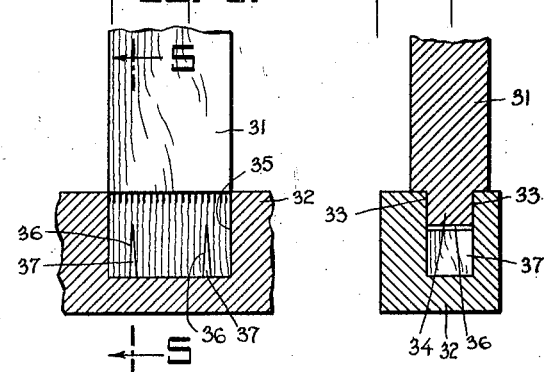
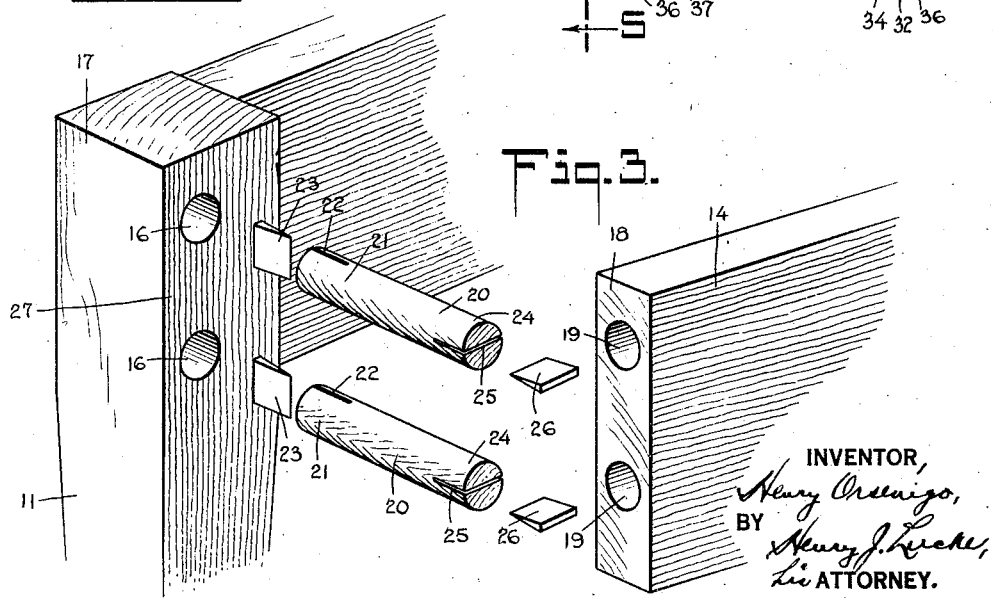

Patented Aug. 27, 1929.

1,726,362

UNITED STATES PATENT OFFICE.

HENRY ORSENIGO, OF MOUNT VERNON, NEW YORK.

JOINT FOR ARTICLES OF FURNITURE AND THE LIKE.

Application filed March 26, 1925. Serial No. 18,590.

This invention relates to joints for articles of furniture and the like.

An object of the invention is to provide an improved form of joint for connecting the legs, arms and the like of tables, chairs and like articles and for joints in general whereby a high required strength is attained and particularly for withstanding moist atmospheric conditions.

A further feature of the invention is the provision of an improved form of joint for furniture and like uses for maintaining the parts in firm connection notwithstanding repeated changes of humidity and exposure to sunshine, and without the necessity of glue or equivalent.

Pursuant to the approved forms of my invention, my joint such as for a leg of a chair, comprises bottomed recesses respectively disposed in the leg and in the frame or other part of the chair to which the leg is joined, within which recesses extends a dowel or equivalent provided with a slot or other opening at the opposite ends of the dowel and a wedge inserted in each slot, whereby upon assembling these parts to form the joint, the wedges expand the body of the dowel to lock its respective end portions to the leg and the frame or other joined part. In the operation of assembling, each wedge encounters the bottom of its recess and is advanced in its slot by the force exerted in bringing the leg and the joined part in the desired proximity to one another.

My invention is preferably carried out by the means of wedges of substantially the same character of material as the dowel or tenon, that is to say, of substantially equivalent co-efficients of absorption of moisture and of expansion under variable atmospheric conditions of humidity and temperature.

My invention is applicable to mortise and tenon joints and other suitable forms generally of joints.

Further features and objects of the invention will be more fully understood from the following detail description and the accompanying drawings, in which Fig. 1 is a side elevation illustrating my invention applied to a chair;

Fig. 2 is a sectional view on line 2—2 of Fig. 1, on an enlarged scale;

Fig. 3 is an exploded view on a greatly enlarged scale showing my invention as applied to an article of furniture of the type illustrated in Fig. 1;

Fig. 4 is a central sectional view of a mortise and tenon joint illustrating generally other forms of my invention; and Fig. 5 is a sectional view on line 5—5 of Fig. 4.

Figs. 1, 2 and 3 of the drawings illustrate the application in general of the dowel form of my invention for an article of furniture such as the chair 10. The chair 10 may be of any type or style and of such contour or configuration of its parts as may be desired. The legs of the chair are indicated at 11, the seat of the chair at 12 and the back of the chair at 13.

For the purpose of illustrating the application of my invention, I have selected the joints between the respective legs 11 and the oppositely disposed aprons, 14, 15; it will be understood that the remaining joints of the chair or other article of furniture may be secured to one another in similar manner.

Referring in particular to Figs. 2 and 3, my joint is attained by the provision of the bottomed recess 16 at a suitable location adjacent the upper end 17 of the leg 11. In the abutting face 18 of the apron 14, is provided the bottomed recess 19 corresponding to and similar to the aforesaid recess 16. The recesses 16, 19 are usually formed of a diameter slightly larger than the diameter of the dowel 20. At one end 21 of the dowel 20 I provide the slot 22 by saw-cutting or the like, for receiving the wedge member 23. At the opposite end 24 of the dowel 20 I provide the slot 25 for receiving the wedge 26 similar to the aforesaid wedge 23. Preferably, the slot 22 is at right angles or otherwise transverse to the slot 25. The width of the wedges 23, 26 is less than the diameter of the respective recesses 16, 19. For wooden articles such as chairs, the dowel and its wedges may be of wood of the required strength and hardness, whereby the material of each dowel and of its wedge possess substantially the same co-efficient of absorption of moisture and the same co-efficient of expansion arising under variable atmospheric conditions of humidity and temperature.

The dowel 20 and its wedges 23, 26 are assembled to form the joint in the manner illustrated in Fig. 3, namely by placing the sharpened end of the wedge 26 in its slot 25, inserting the end 21 of the dowel and its wedge 23 into the recess 16 of the leg 11 and similarly inserting into the recess 19 the end 24 of the dowel 20 having the wedge 26 placed in its slot 25. The depth of the recess 16 and the depth of the recess 19 are such that upon bringing the face 18 of the apron 14 in abutting or other desired proximate relation with the face 27 of the upper portion 17 of the leg 11, the wedges 23, 26 respectively encounter the bottoms of the recesses 16, 19, are advanced in their respective slots 21, 25 and expand the end portions 21, 24 of the dowel 20 sufficiently to firmly bind the dowel 20 in locking relation with the apron 14 and the leg 11, thereby completing the desired joint and whereby the innermost faces at the respective ends 21, 24 of the dowel 20 are forcibly seated in immediate contact with the bottom faces of the respective recesses 16, 19. Such joint is formed independently of the use of glue or the like applied to the wedges or to the dowel.

Preferably, for a leg of a chair or like part which is subject to severe use, a pair of dowels 20 is employed for each joint as is indicated in Fig. 3, and like reference numbers designate like parts.

The relative positions of each dowel 20 and its wedges 23, 26 when in a final position are indicated in Fig. 2.

In a similar manner, the apron 15 is joined in abutting relation with the face 28 of the leg 11 by one or more dowels 29 and coacting wedges 30, 31, similar to the corresponding parts as aforesaid.

It will be observed that in the use of my invention illustrated in Figs. 1, 2 and 3, the dowels effect the joints of the desired number by the concealment of the parts securing the joints.

My invention is applicable in general for forming joints without the use of a dowel, as for example of the mortise and tenon type of joint, one form of which is illustrated in Figs. 4 and 5. Thus, for connection of the member 31 to another member 32, the tenon may be formed of one of such members, as for example the member 31 by cutting away on one or both sides as is indicated at 33 adjacent one end of the member 31 to form the resulting tenon 34. The other member 32 is suitably mortised as is indicated at 35 to snugly receive the faces of the tenon 34. At the free end of the tenon 34, I provide one or more slots 36 by saw-cutting or the like for receiving the sharpened end of a wedge 37. The depth of the mortised recess is such that upon placing the one or more wedges 37 in their respective slots 36 and inserting the tenon 34 within the mortise opening 35, accompanied by the required force to bring the members 31, 32 into close adjacency, the enlarged end of each wedge 37 encounters the bottom of the mortised opening 35 and each wedge 37 is advanced in its slot 36 sufficiently to force the portions of the tenon 34 on opposite sides of the slots 36 and firmly lock the tenon 34 of the member 31 in the mortised opening 35 of the member 32 and whereby the innermost face of the tenon 34 is forcibly seated in immediate contact with the bottom of the mortised opening 35.

In a similar manner, joints between any two members are effected either by the use of a dowel of wood or other suitable material capable of expanding without substantial fracture by coaction with a wedge of like character of material received within a slot or equivalent, or by the provision of a slot or equivalent on a tenon or like projection received within a mortised opening or other recess in coaction with a wedge and with or without a glue.

My invention is applicable for joints of parts of various types of furniture such as tables, chiffoniers, wardrobes and the like, similarly to the particular embodiments illustrated in the drawings, also to the parts of automobile bodies, such as stiles and standards and other parts interconnecting the bottom, side and top frames and other similar uses.

Whereas, I have described my invention by reference to specific forms thereof, it will be understood that many changes and modifications may be made without departing from the spirit of the invention.

I claim:

1. A joint for interconnecting a leg or similar part of an article of furniture or the like with another part of such article, each of said parts being provided with a bottomed recess having a predetermined dimension of depth, comprising a dowel having a length substantially equal to the dimension of said predetermined depth and said dowel having an outline of substantially a true cylinder being provided with a slot at its opposite ends, said slots being disposed in transverse directions to one another, a wedge member of a material having substantially the co-efficients of absorption of moisture and of expansion under variable temperature of those of the material of said dowel and received within one of said slots and disposed in one of said bottomed recesses and a second wedge member of a material having substantially the co-efficients of absorption of moisture and of expansion under variable temperature of those of the material of said dowel and received in the other of said slots and disposed in the other of said bottomed recesses, said wedge member serving to expand the respective opposite end portions of said dowel and to lock the end portions with their innermost face in forcible and immediate contact with the bottom faces of said bottomed recesses respectively.

2. A joint for interconnecting a leg or similar part of an article of furniture with another part of such article, said parts being respectively provided with bottomed recesses, each of said recesses having an outline of substantially a true cylinder and having predetermined substantially uniform cross-sections and further having certain depths, comprising a dowel having a substantially uniform cross-section and substantially the predetermined cross-section of said recess, said dowel having a length substantially equal to the sum of said certain depths, said dowel being provided with slots at its opposite ends said slots being disposed in transverse directions to one another, and wedge members respectively received within said slots, the end faces of said wedges being disposed substantially flush with the end faces of said dowel and in pressure engagement with the bottoms of said recesses when said dowel is positioned within said bottomed recesses.

3. A joint for interconnecting a leg or similar part of an article of furniture with another part of such article, said parts being respectively provided with bottomed recesses, each of said recesses having an outline of substantially a true cylinder and having predetermined substantially uniform circular cross-sections and further having certain depths, comprising a dowel having a substantially uniform circular cross-section and substantially the predetermined cross-section of said recess, said dowel having a length substantially equal to the sum of said certain depths, said dowel being provided with slots at its opposite ends, and wedge members respectively received within said slots, the end faces of said wedges being disposed substantially flush with the end faces of said dowel and in pressure engagement with the bottoms of said recesses when said dowel is positioned within said bottomed recesses and the cylindrical face of said dowel being in direct engagement under pressure with the side face of said recesses.

In testimony whereof I have signed this specification this 24th day of March, 1925.

HENRY ORSENIGO.